(12) United States Patent
Kagitani et al.

(10) Patent No.: US 6,196,829 B1
(45) Date of Patent: Mar. 6, 2001

(54) APPARATUS FOR FORMING HOLLOW ARTICLE

(75) Inventors: Toshio Kagitani; Shouji Abe, both of Kanagawa (JP)

(73) Assignee: The Japan Steel Works, Ltd., Tokyo (JP)

(*) Notice: Subject to any disclaimer, the term of this patent is extended or adjusted under 35 U.S.C. 154(b) by 0 days.

(21) Appl. No.: 09/203,533

(22) Filed: Dec. 1, 1998

(30) Foreign Application Priority Data

Dec. 2, 1997 (JP) .................................... 9-347089

(51) Int. Cl.$^7$ .................................................. B29C 49/32
(52) U.S. Cl. ...................... 425/532; 425/537; 425/538; 425/541
(58) Field of Search ..................... 425/541, 538, 425/537, 532

(56) References Cited

U.S. PATENT DOCUMENTS

| | | | | |
|---|---|---|---|---|
| 3,743,466 | * | 7/1973 | Gampe | 425/538 |
| 5,576,034 | | 11/1996 | Kiefer et al. | 425/532 |

FOREIGN PATENT DOCUMENTS

185110 A1 * 6/1986 (EP) ..................................... 425/538

* cited by examiner

*Primary Examiner*—Robert Davis
(74) *Attorney, Agent, or Firm*—Oblon, Spivak, McClelland, Maier & Neustadt, P.C.

(57) ABSTRACT

Provided is a swing-driving device for driving two low molding units so as to swing around corresponding swinging fulcrums, each of the blow molding units having a carriage, one end portion of which is supported by the swinging fulcrum so as to swing, and a blow molding mold disposed on the carriage. The blow molding mold of one blow molding unit receives a parison on a common receiving position and is made to be an mold close state. The blow molding mold swings around a swinging fulcrum, and moves from the receiving position to a shunting position via a detaching position. Thereafter, the blow molding mold returns to the detaching position and is made to be a mold open state. A hollow article formed by blow-molding the parison in the blow molding mold is take out and moved to the receiving position kept in the mold open state. The other blow molding unit swings from another shunting position to another detaching position similarly to the case of said one blow molding unit, immediately after one blow molding unit has moved to the shunting position.

4 Claims, 5 Drawing Sheets

APPARATUS FOR FORMING HOLLOW ARTICLE

BACKGROUND OF THE INVENTION

1. Field of the Invention

The present invention relates to a method for forming a hollow article using an extrusion molding technology and an apparatus for the same, more particularly to a method for forming a hollow article using a plurality of blow molding units and an apparatus for the same.

2. Description of the Related Art

When comparatively large hollow articles such as a fuel tank for use in cars and a can are manufactured using an extrusion blow molding technology, a plurality of blow molding units, each of which comprises a blow molding mold, have been used and the receiving position where a parison is received and the position where the parison is expanded by blowing air thereinto have been made to be separate from each other. As such conventional kinds of apparatuses for the forming hollow article, the apparatus disclosed in Japanese Patent Application Laid-open No. 251441/1995, for example, has been known. The features of this apparatus are as follows.

(1) There are two or more blow molding units and there are one or more extrusion heads of an extrusion system.

(2) Each of the blow molding units is moved from a position apart in a certain direction to a detaching position of the hollow article by a first movement operation, and moved to a receiving position for receiving the parison by a second movement operation. Movement directions in the first and second movement operations are different.

(3) Each of the blow molding units is made to be an open state after it reaches the detaching position. Thereafter, the hollow article already molded in a blow molding mold is taken out, and then the blow molding mold unit is moved to the receiving position with the blow molding mold left in an open state.

However, the apparatus for forming a hollow article using the conventional extrusion molding technology has the following technological problems.

Specifically, each of the blow molding units is moved from the position apart in a certain direction to the detaching position by the first movement operation, and moved to the receiving position by a second movement operation which moves the blow molding unit to a different movement direction from the movement direction of the first movement operation. For this reason, driving devices to move the blow molding unit into the two directions are needed, so that the structure of the apparatus will be complicated and disadvantageous economically.

SUMMARY OF THE INVENTION

The object of the present invention is to provide a method for forming a hollow article and an apparatus for the same, which are capable of not only simplifying a driving device for driving a blow molding unit and a structure of the blow molding unit but also significantly reducing a space for accommodating the blow molding unit.

Another object of the present invention is to provide a method for forming a hollow article and an apparatus for same, which are capable of performing a high cycle molding and enhancing effects of the high cycle molding by combining it with a continuous extrusion of a parison from an extrusion head.

Still another object of the present invention is to provide a method for forming a hollow article and an apparatus for same, which are capable of ensuring the maintenance to be compatible with the ensuring of an operation rate.

Still another object of the present invention is to provide a method for forming a hollow article and an apparatus for same, which are capable of not only enhancing operability and safety but also achieving a low cost by simplifying the structure.

To achieve the above-described objects, the present invention provides a method for forming a hollow article comprising the steps of:

allowing a blow molding mold of one of two blow molding units to receive a parison in a receiving position and to take a mold close state, each blow molding unit including a carriage which has an end portion supported by a swinging fulcrum so as to freely swing and a blow molding mold which is disposed on the carriage; swinging one of the blow molding units around the swinging fulcrum, allowing the blow molding mold thereof to pass through a detaching position from a receiving position so as to reach to a shunting position for avoiding an interference of one blow molding unit with the other blow molding unit; returning the blow molding mold from the shunting position to the detaching position and causing the blow molding mold to take a mold open state, thereby taking out a hollow article which is formed by blow molding in the blow molding mold; moving the blow molding mold kept in the mold open state to the receiving position; and swinging the other blow molding unit so as to move the other blow molding mold thereof from another shunting position to another detaching position and the receiving position, and returning the other blow molding unit to the another shunting position from the receiving position via the another detaching position similarly to the case of one blow molding unit, immediately after one blow molding unit reached to the shunting position.

In addition, the present invention provides an apparatus for forming a hollow article comprising:

an extrusion device disposed at a fixed location, which includes at least one extrusion head and extrudes downward a parison from the extrusion head, the parison being formed of a thermoplastic material softened by heating; two blow molding units having a carriage, one end portion of which is supported by a swinging fulcrum so as to swing, a blow molding mold disposed on the carriage, and an open-close device allowing the blow molding mold to perform an open-close operation, wherein each blow molding mold is divided into at least two, and has mold components for defining a cavity showing an outline which conforms to the external shape of the hollow article in a state where the mold components are made to be in a mold close state by being driven by the open-close device; and a swing-driving device for driving each blow molding unit so as to swing around corresponding swinging fulcrums, allowing each blow molding mold to occupy a receiving position, a shunting position for avoiding interference of one blow molding unit with the other blow molding unit, and a detaching position, the detaching position and the shunting position being located on one side of a central line of the extrusion device, whereby each blow molding mold receives the parison in the common receiving position, is driven by the open-close device so as to be a mold close state, and moves from the receiving position to the shunting position via the detaching position, and thereafter, each blow molding mold is returned to the detaching position, and driven by the open-close device so as to be a mold open state, and a hollow article which is formed by blow molding the parison in the blow molding mold is taken out, and moved to the receiving position as kept in the mold open state.

In accordance with a further aspect of the invention, the swinging fulcrum of each blow molding unit is set so that each blow molding mold of the two blow molding units occupies the common receiving position and the common detaching position.

The above and other objects, features and advantages of the present invention will become apparent from the following description based on the accompanying drawings which illustrates examples of preferred embodiments of the present invention.

DETAILED DESCRIPTION OF THE PREFERRED EMBODIMENTS

Embodiments of the present invention will be described with reference to the accompanying drawings.

First Embodiment

Figure 1:
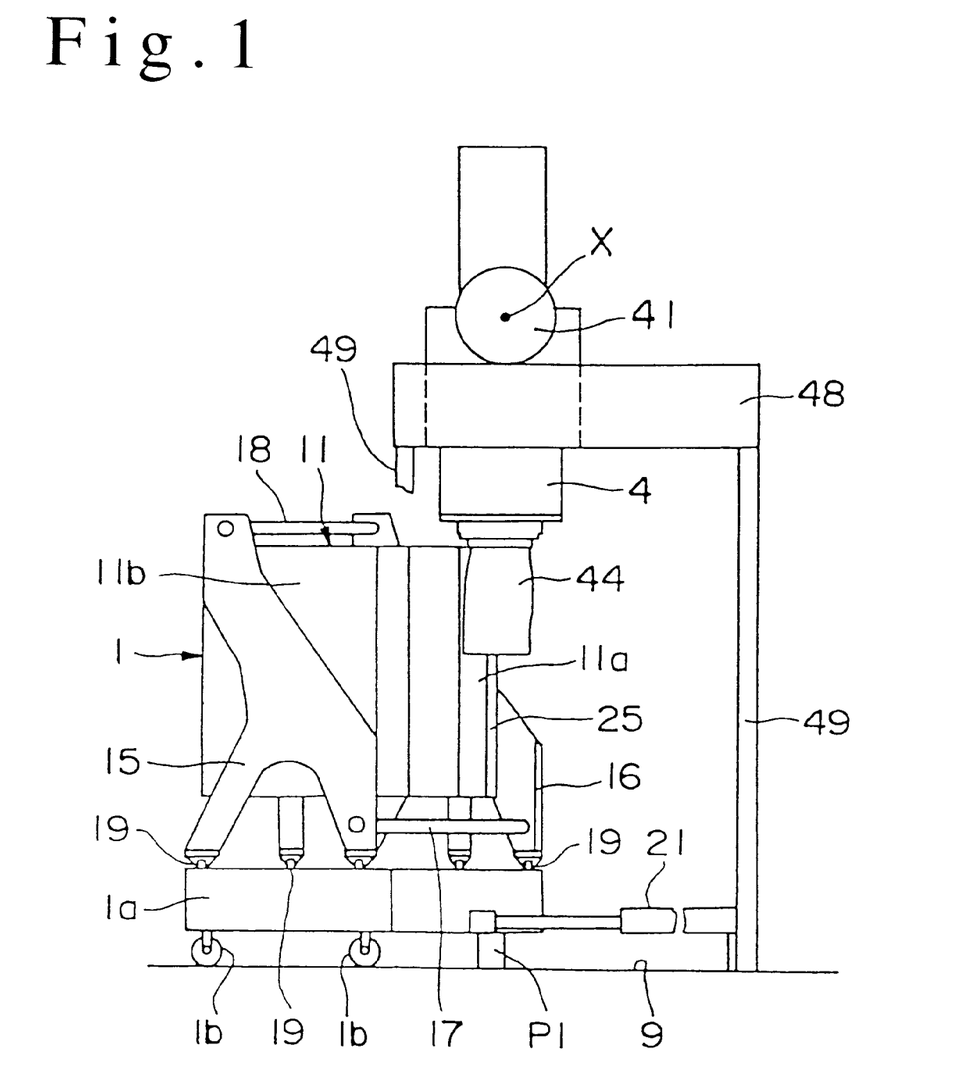
FIG. 1 is a drawing showing a constitution of an apparatus for forming a hollow article by an extrusion molding technology according to a first embodiment of the present invention, which is viewed from a direction of the arrow D of FIG. 2.
Figure 2:
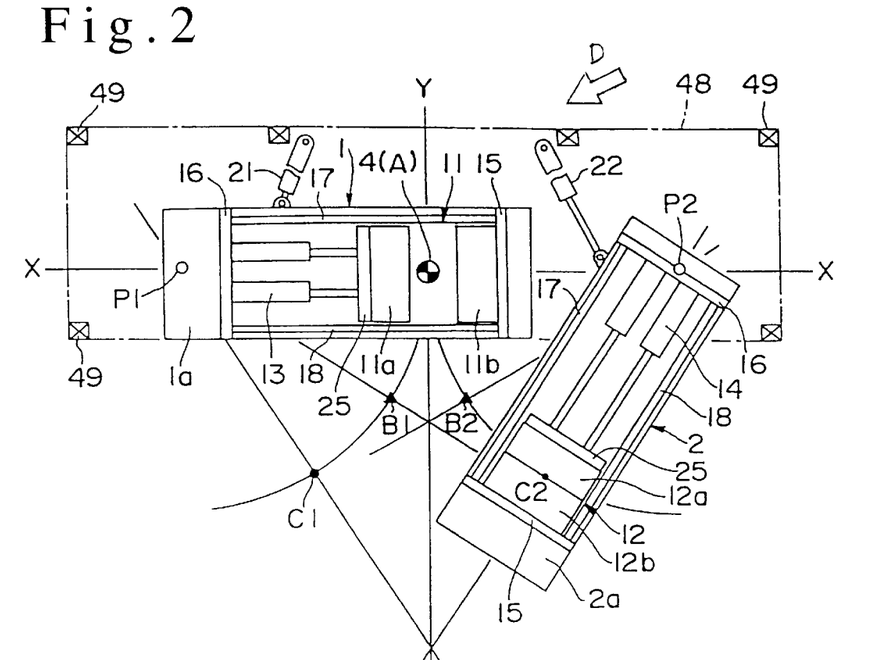
FIG. 2 is a drawing for explaining an operation of the apparatus of the first embodiment of the present invention, which is a plan view of FIG. 1.

In FIGS. 1 and 2, reference numerals 1 and 2 denote blow molding units, respectively. The blow molding units 1 and 2 have similar structures. Each of the blow molding units 1 and 2 comprises carriages 1a and 2a, each of which has an end portion supported on a base 9 by the corresponding one of swinging fulcrums P1 and P2 shown in FIG. 1 so as to freely swing. Blow molding molds 11 and 12 are provided on the carriages 1a and 2a, respectively.

Swing-driving device 21 and 22 can be constituted by double acting cylinders which connect the base 9 and the carriages 1a and 2a. By allowing carriages 1a and 2a to reciprocate around the swinging fulcrums P1 and P2 by driving the devices 21 and 22, the blow molding molds 11 and 12 provided on the other end sides of the blow molding units 1 and 2 occupy later described common receiving position A, detaching positions B1 and B2 and shunting positions C1 and C2. It is also possible to construct the swing-driving devices 21 and 22 from a motor, a speed reducing gear device and the like as a rotary driving power source. By rotating the gears having their centers at the swinging fulcrums P1 and P2 of the carriages 1a and 2a forward or reverse, the blow molding units 1 and 2 can be reciprocally swung around the swinging fulcrums P1 and P2.

Each of the blow molding molds 11 and 12 comprises mold components 11a, 11b, 12a and 12b. The mold components 11a and 11b can reciprocate between an open state in which both of the mold components 11a and 11b separate from each other and a close state in which they contact each other. The mold components 12a and 12b can also reciprocate between the open state and the close state. Mold cavities are formed in facing planes of the mold components 11a, 11b, 12a and 12b and an outline of the cavities corresponds to an external shape of the hollow article which is obtained by freely expanding a parison 44 shown in FIG. 1 by increasing its internal pressure. The mold components 11a, 11b, 12a and 12b of the blow molding molds 11 and 12 are made to reciprocate by open-close device 13 and 14 (clamping device) which performs an open-close operation.

Actually, as shown in FIGS. 1 and 2, an end portion of the carriage 1a of one blow molding unit 1 is supported on the base 9 by the swinging fulcrum P1 so as to freely swing. A rolling element 1b provided at the other end portion of the carriage 1a is allowed to freely roll on the base 9. Moreover, supports 15 and 16 are disposed on the outside of the mold components 11a and 11b, and connected by tie rods 17 and 18. The tie rod 17 disposed at the lower position is provided at the position where it does not hinder the receipt of the parison 44. Moreover, a support 25 is fixed behind one mold component 11a. An open-close device 13 is disposed between the supports 25 and 16 positioned on one end portion side.

By an operation of the open-close device 13, the mold components 11a and 11b are separated from each other whereby a mold opening can be performed and contacted with each other whereby a mold closing can be performed. It should be noted that a pair of the mold components 11a and 11b are driven by a synchronous apparatus (not shown) synchronizing them at the same time. At this time, the supports 15, 16 and 25 move smoothly by rolling the rolling elements 19 shown in FIG. 1 on the carriages 1a and 2a. The other blow molding unit 2 also has a similar structure, and the same function portions of blow molding unit 1 are denoted by the same reference numerals as shown in FIG. 2.

On the other hand, an extrusion device 41 is disposed above the blow molding units 1 and 2 as shown in FIG. 1. The extrusion device 41 is supported on the base 9 and fixed thereto through a supporting rod 49 and a supporting stage 48, and comprises a common extrusion head 4. Generally, the extrusion head 4 can continuously supply the parison 44. The extrusion device 41 may also be constituted such that a plurality of extrusion devices are connected to the extrusion head 4. In the case where the plurality of extrusion devices 41 are connected to the extrusion head 4, also the parison 44 hanging down from the extrusion head 4 in the form of tube takes a multi-layer structure formed of a thermally softened thermoplastic material which is extruded from each extrusion device 41.

By individually driving the blow molding units 1 and 2 so as to swingingly reciprocate by the swing-driving devices 21 and 22, the centers of the parting planes of the mold components 11a, 11b, 12a and 12b of the blow molding molds 11 and 12 can be moved between the common receiving position A for receiving the parison 44 and the shunting positions C1 and C2 for avoiding interference with other blow molding units 2 and 1 through the detaching positions B1 and B2 for detaching the expanded hollow article from blow molding molds 11 and 12. Therefore, the receiving, detaching and shunting positions A, B1 and C1 are positioned on the arc with center at one swinging fulcrum P1, and the receiving, detaching and shunting positions A, B2 and C2 are positioned on the arc with center at the other swinging fulcrum P2. It should be noted that the parison 44 received in the receiving position A is expanded by the blow molding so as to form the hollow article before the blow molding molds 11 and 12 reach the shunting positions C1 and C2 after passing through the detaching positions B1 and B2 from the receiving position A.

Here, the swinging fulcrums P1 and P2 are placed keeping the following positional relationship. Specifically, in the shown view shown in FIG. 2, the lines passing through the extrusion head 4 and crossing at a right angle are denoted by the reference symbols X and y, and the center axis line of the extrusion device 41 in which one or two extrusion devices are disposed on the straight line is made to be coincident with the line X. Accordingly, the line X is in agreement with the longitudinal direction of a support stage 48. The swinging fulcrums P1 and P2 are disposed symmetrically with respect to the line Y, and the detaching positions B1 and B2 and the shunting positions C1 and C2 are positioned at the same external side, in other words, they are positioned outside the support stage 48 in FIG. 2. As a result, when viewed from above, the detaching positions B1 and B2 and shunting positions C1 and C2 of the respective blow molding molds 11 and 12 of the two blow molding units 1 and 2 are positioned on one side of the center axis line X of the extrusion device 41, that is, the positions B1, B2, C1 and C2 are positioned below the line X in FIG. 2. Thus, by the comparatively small swinging movement of the blow molding units 1 and 2, the receiving position A and the detaching positions B1 and B2 can be taken, and a pair of detaching positions B1 and B2 can be disposed closely to each other. At the same time, it will be possible to prevent a upward detaching operation of the hollow article from being hindered by the support stage 48. Therefore, in the case where the three or more extrusion devices 41 are connected to the extrusion head 4, they are disposed behind the line X, that is, they are disposed at the upper portion of FIG. 2.

Next, an operation of the first embodiment will be described.

Figure 3:
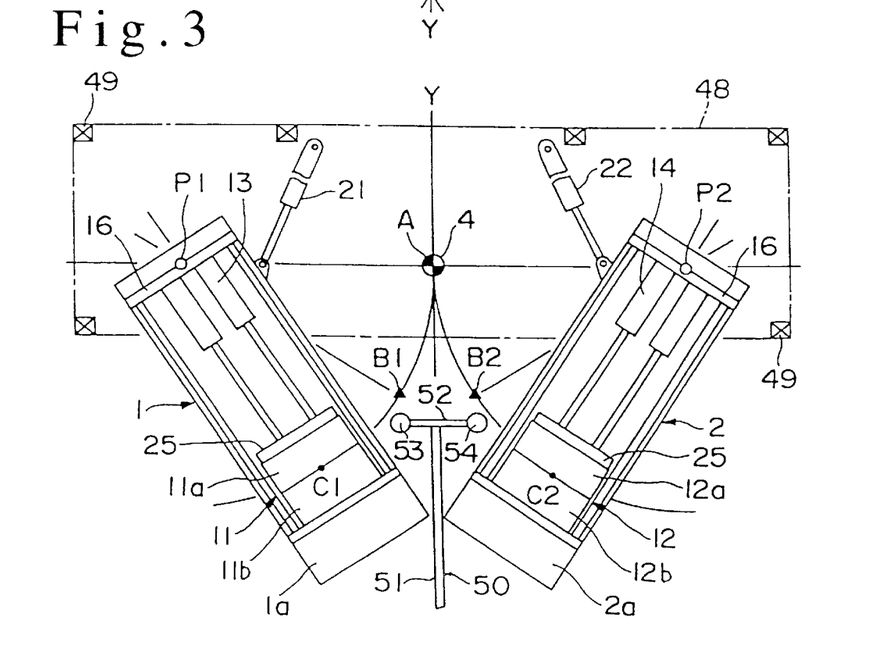
FIG. 3 is a drawing for explaining an operation subsequent to the situation shown in FIG. 2.

At the beginning, as shown in FIG. 2, it is assumed that the blow molding mold 11 of one blow molding unit 1 is occupying the receiving position A, and the blow molding mold 12 of the other blow molding unit 2 is occupying the shunting position C2. In this situation, since the blow molding mold 11 of one blow molding unit 1 is opened and the parison 44 continuously extruded downward from the extrusion head 4 hangs down between the mold components 11a and 11b, the open-close device 13 is driven so that the blow molding mold 11 is closed. Thereafter, one blow molding unit 1 is driven swingingly by the swing-driving device 21. The blow molding unit 1 is made to pass through the detaching position B1 to occupy the shunting position C1 as shown in FIG. 3. The parison 44 which reached the shunting position C1 is expanded by air and molded to, for example, a shape of fuel tanks for use in cars. Thereafter, in the shunting position C1, the parison 44 expanded to the shape of the hollow article is cooled in the blow molding mold 11.

Figure 4:
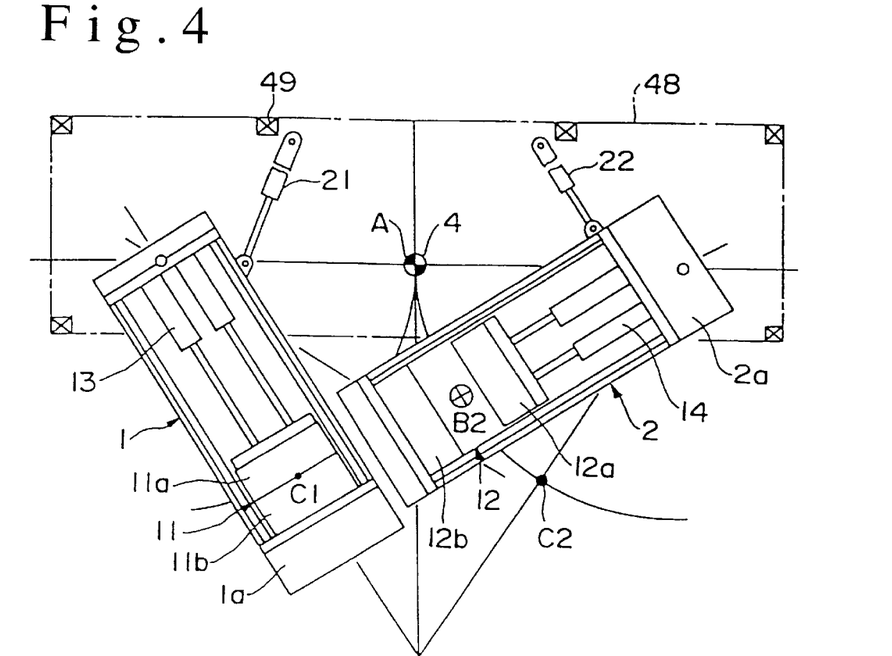
FIG. 4 is a drawing for explaining an operation subsequent to the situation shown in FIG. 3.

Subsequently, as shown in FIG. 4, the other blow molding unit 2 is driven by the swing-driving device 22 swingingly, so that the blow molding mold 12 is made to occupy the detaching position B2. Since the parison 44 has already been received by the blow molding mold 12 of this blow molding unit 2 as will be described later, the solidified part (flash) of the parison 44, which overflows from the blow molding mold 12 occupying the detaching position B2, is seized by the clamping device 50 shown in FIG. 3, and taken out together with the hollow article.

The clamping device 50 comprises a main unit 51 driven in the direction of the line Y by a driving device located outside FIG. 3; an extending portion 52 extending to both sides of the main unit 51 in a perpendicular direction to the unit 51 (the direction to the line X); and seizing portions 53 and 54 provided on both ends of the extending portion 52. At least one of the seizing portions 53 and 54 can be rotated, and the hollow article of the blow molding mold 11 seized by one seizing portion 53 and the hollow article of the blow molding mold 12 seized by the other seizing portion 54 are made to be directed to the same direction, and both hollow articles can be taken out downward as show in FIG. 3. The hollow articles taken out downward in FIG. 3 are released from seizing by the seizing portions 53 and 54 and transported to the outside by a belt conveyer (not shown).

Figure 5:
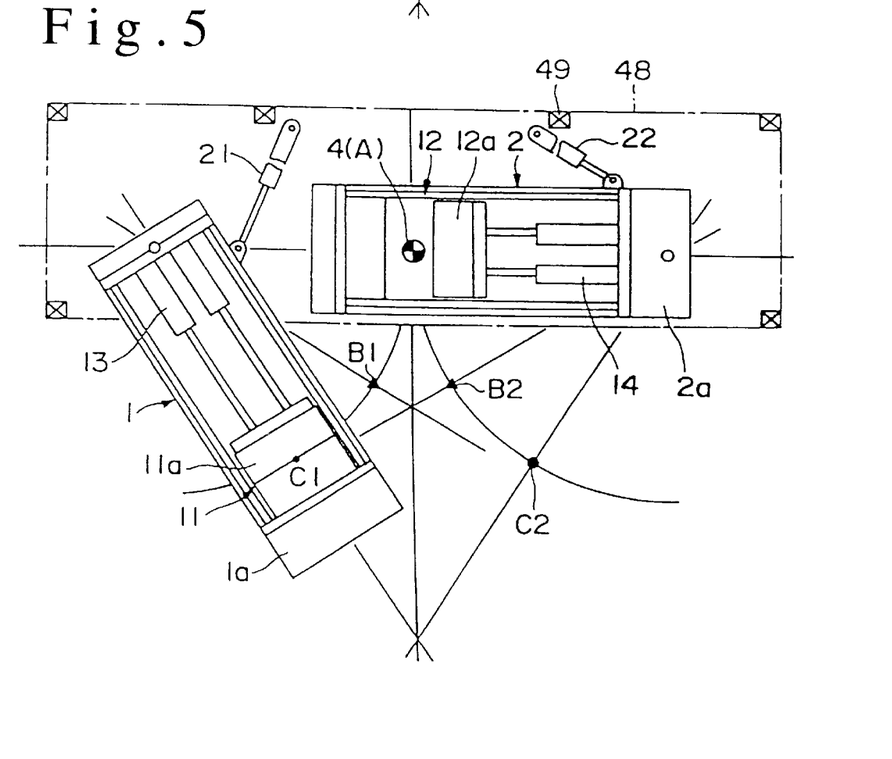
FIG. 5 is a drawing for explaining an operation subsequent to the situation shown in FIG. 4.

After the hollow article was detached from the blow molding mold 12, the other blow molding unit 2 is driven by the swing-driving device 22 swingingly as shown in FIG. 5, and moved to the receiving position A in its mold opening state. Since the parison 44 continuously extruded downward from the extrusion head 4 is received between the mold components 12a and 12b of the blow molding mold 12, the mold components 12a and 12b are closed by the open-close device 14.

Figure 6:
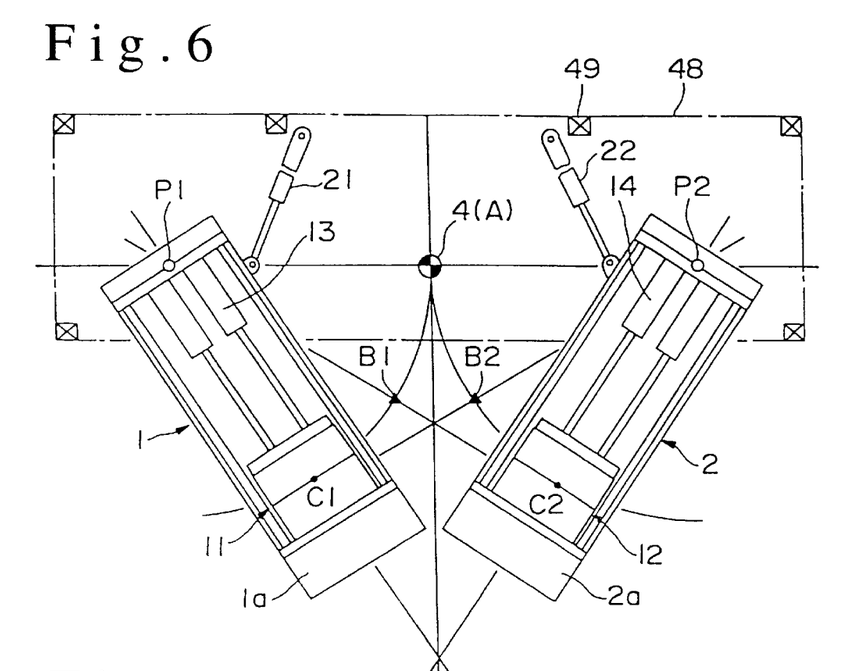
FIG. 6 is a drawing for explaining an operation subsequent to the situation shown in FIG. 5.

Subsequently, the other blow molding unit 2 is driven by the swing-driving device 22 swingingly as shown in FIG. 6, and made to pass through the detaching position B2 to occupy the shunting position C2 as kept in its mold closing state. Air is blown into the parison 44 in the blow molding mold 12 which occupies the shunting position C2 so that the parison 44 is molded to the shape of a fuel tank for cars, similarly to foregoing one blow molding mold 11. At the same time, cooling is performed for the parison 44 taking the form of the hollow article.

Figure 7:
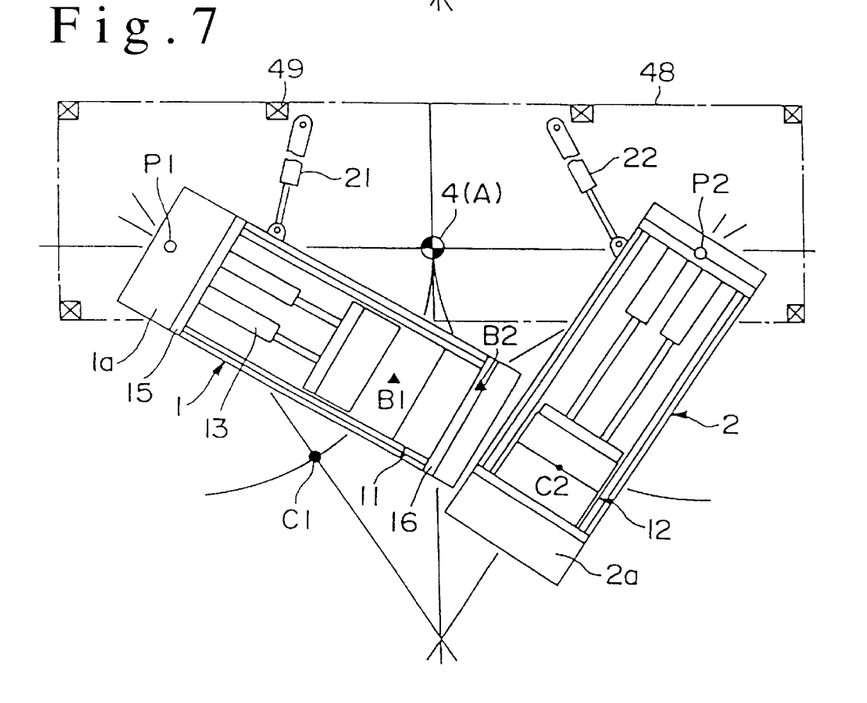
FIG. 7 is a drawing for explaining an operation subsequent to the situation shown in FIG. 6.

While the blow molding mold 12 is occupying the shunting position C2, one blow molding mold 1 in which the cooling of the parison 44 has proceeded in the shunting position C1 is driven by the swing-driving device 21 swingingly, and moved into the detaching position B1 as kept in its mold close state. The solidified part (flash) of the parison 44 overflowing from the blow molding mold 11 which occupies the detaching position B1 is seized by one seizing position 53 of the clamping device 13 and the mold components 11a and 11b are separated from each other by the open-close device 13. At the same time, the main unit 51 of the clamping device 50 is driven in the direction of the line Y, so that the hollow article is taken out to the outside. This situation is illustrated in FIG. 7.

Thereafter, one blow molding unit 1 is driven by the swing-driving device 21 swingingly, and moved to the receiving position A, as kept in its mold open state. Since the parison 44 extruded downward continuously from the extrusion head 4 is received between the mold components 11a and 11b of the blow molding mold 11, a plurality of hollow articles can be formed by the blow molding by repeating the similar operations. As described above, by giving the receiving position A, the shunting positions C1 and C2 and the detaching positions B1 and B2 to the pair of blow molding units 1 and 2 sequentially, the similar operations are repeatedly performed.

Second Embodiment

Figure 8:
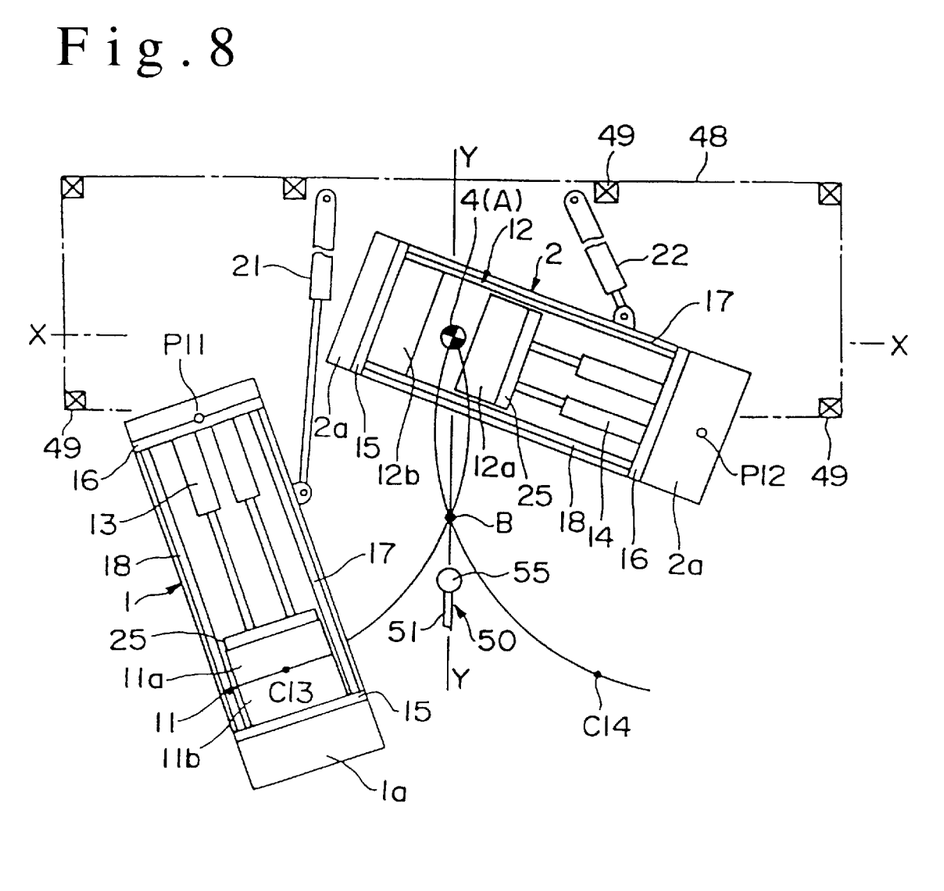
FIG. 8 is a drawing for explaining an operation of an apparatus for forming a hollow article by an extrusion molding technology according to a second embodiment of the present invention.

FIG. 8 shows a second embodiment of the present invention. Substantially the same function portions as those in the first embodiment of FIG. 8 are denoted by the same reference numerals and symbols, and the descriptions for them are omitted. In the two blow molding units 1 and 2 shown in FIG. 8, the swinging fulcrums P11 and P12 are set so that each of the blow molds 11 and 12 occupies the common detaching position B.

Specifically, the swinging fulcrums P11 and P12 are set so that the fulcrums P11 and P12 are somewhat shifted from the line X toward the side where the detaching position B and the shunting positions C13 and C14 are positioned and the swinging fulcrums P11 and P12 are symmetrical with respect to the line Y. Thus, the arc trajectories of the central portions of the parting planes around the two swinging fulcrums P11 and P12, which are drawn by the mold components 11a, 11b, 12a and 12b of the blow molding molds 11 and 12, will cross at the two points. One of these two cross points is used as the common receiving point A for receiving the parison 44, and the other is used as the common detaching point B for detaching the freely expanded hollow article from the blow molding molds 11 and 12.

Thus, through the common detaching position B the blow molding mold 11 swingingly driven around the swinging fulcrum P11 by the swing-driving device 21 can move between the common receiving position A and the shunting position C13 for preventing the interference with another blow molding unit 2. Similarly, through the common detaching position B the blowing molding mold 12 swingingly driven around the swinging fulcrum P12 by the swing-driving device 22 can move between the common receiving position A and the common shunting position C14 for preventing the interference with the other blow molding unit 1. The detaching position B and the shunting positions C13 and C14 are positioned on the same external side of the support stage 48 when viewed from above, so that the operation for detaching the hollow article can be prevented from being hindered by the support stage 48.

The second embodiment of the present invention can exhibit the same effects as the first embodiment, except for sharing the detaching position B. Specifically, at the state where the state the blow molding mold 11 of one blow molding unit 1 is occupying the receiving position A and the blow molding mold 12 of the other blow molding unit 2 is occupying the shunting position C14 similarly to the case shown in FIG. 2, the parison 44 is received by the blow molding mold 11. Thereafter, one blow molding unit 1 is made to pass through the detaching position B to occupy the shunting position C13, similarly to the case shown in FIG. 3.

Subsequently, similarly to the case shown in FIG. 4, the other blow molding mold 12 is made to occupy the detaching position similarly to the case shown in FIG. 4, and the solidified part (flash) of the parison 44 which has been already received in the blow molding mold 12 is seized by the seizing portion 55 of the clamping device 50 shown in FIG. 8, and taken out together with the hollow article. If the hollow article has been detached from the blow molding mold 12, the other molding unit 2 is made to move into the receiving portion A similarly to the case shown in FIG. 5, and the parison 44 is received in the blow molding mold 12.

The other blow molding unit 2 is made to pass through the detaching position B so as to occupy the shunting position C14 similarly to the case shown in FIG. 6. The parison 44 in the blow molding mold 12 which occupies the shunting position C14 is formed to, for example, the shape of a fuel tank for use in cars by blowing air thereinto according to the similar procedures for foregoing one blow molding mold 11, and cooling of the parison 44 is performed.

While this blow molding mold 12 is occupying the shunting position C14, one blow molding unit 1 in which cooling of the hollow article has been already proceeded in the shunting position C13 is made to move to the detaching position B. The solidified part (flash) of the parison 44 overflowing from the blow molding mold 1 which occupies the detaching position B is seized by the seizing portion 55 of the clamping device 50, and the mold components 11a and 11b are separated from each other. At the same time, the hollow article is taken out. Thereafter, one blow molding unit 1 is moved to the receiving position A, and the parison 44 continously extruded downward from the extrusion head 4 is received between the mold components 11a and 11b of the blow molding mold 11. Then, by repeatedly performing the similar operations, a plurality of hollow articles can be formed by the blow molding.

As described above, while giving the receiving position A, the shunting position C13 and C14 and the detaching position B to the pair of blow molding units 1 and 2, the similar operations are performed for the blow molding units 1 and 2. As a matter of course, the seizing portion 55 provided on the tip portion of the main unit 51 of the clamping device 50 need not to be provided by two unlike the first embodiment in which the two seizing portions 53 and 54 are provided, and one seizing portion corresponding to the common detaching position B may be satisfactorily provided.

The above-described blow molding units 1 and 2 include a member for supporting the blow molding molds 11 and 12, a member for blowing pressurized air such as a mandrel and a tube, and the like. It is also possible to provide the three or four blow molding units 1 and 2. Furthermore, it is satisfactory that the blow molding molds 11 and 12 may comprise at least two mold components.

The blow molding molds 11 and 12 of the blow molding units 1 and 2 include the one that defines a plurality of cavities for a plurality of blow molding. In the base where there are a plurality of cavities of the blow molding molds 11 and 12, the number of the extrusion heads 4 is made to be in agreement with that of the cavities.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. An apparatus for forming a hollow article comprising:
   an extrusion device disposed at a fixed location, which includes at least one extrusion head and extrudes downward a parison from said extrusion head, said parison being formed of a thermoplastic material softened by heating;
   two blow molding units having a carriage, one end portion of which is supported by a swinging fulcrum so as to swing, a blow molding mold disposed on said carriage, and an open-close device allowing said blow molding mold to perform an open-close operation, wherein each blow molding mold is divided into at least two, and has mold components for defining a cavity showing an outline which conforms to the external shape of said hollow article in a state where said mold components are made to be in a mold closed state by being driven by said open-close device;

a swing-driving device for driving each blow molding unit so as to swing around corresponding swinging fulcrums, allowing each blow molding mold to occupy a receiving position, a shunting position for avoiding interference of one blow molding unit with the other blow molding unit, and a detaching position, said detaching position and said shunting position being located on one side of a central line of said extrusion device; and a clamping device having two seizing portions corresponding to said detaching position, whereby each blow molding mold receives said parison in a common receiving position, is driven by said open-close device so as to be in a closed mold state, and moves from said receiving position to said shunting position via said detaching position, and thereafter, each blow molding mold is returned to said detaching position, and driven by said open-close device so as to be in an opened mold state, and a hollow article which is formed by blow molding said parison in said blow molding mold is taken out by said clamping device, and moved to said receiving position as kept in said opened mold state.

2. The apparatus for forming a hollow article according to claim 1, wherein said detaching position of each blow molding mold of said blow molding units is located on the outside of a support stage for supporting said extrusion device.

3. An apparatus for forming a hollow article comprising:

an extrusion device disposed at a fixed location, which includes at least one extrusion head and extrudes downward a parison from said extrusion head, said parison being formed of a thermoplastic material softened by heating;

two blow molding units having a carriage, one end portion of which is supported by a swinging fulcrum so as to swing, a blow molding mold disposed on said carriage, and an open-close device allowing said blow molding mold to perform an open-close operation, wherein each blow molding mold is divided into at least two, and has mold components for defining a cavity showing an outline which conforms to the external shape of said hollow article in a state where said mold components are made to be in a mold closed state by being driven by said open-close device;

a swing-driving device for driving each blow molding unit so as to swing around corresponding swinging fulcrums, allowing each blow molding mold to occupy a receiving position, a shunting position for avoiding interference of one blow molding unit with the other blow molding unit, and a detaching position, said detaching position and said shunting position being located on one side of a central line of said extrusion device, said swinging fulcrums of each blow molding unit are somewhat shifted from said central line toward a side where said detaching position and said shunting position are positioned so that each blow molding mold of said two blow molding units occupies a common receiving position and a common detaching position; and a clamping device having one seizing portion corresponding to said common detaching position, whereby each blow molding mold receives said parison in said common receiving position, is driven by said open-close device so as to be in a closed mold state, and moves from said common receiving position to said shunting position via said common detaching position, and thereafter, each blow molding mold is returned to said detaching position, and driven by said open-close device so as to be in an opened mold state, and a hollow article which is formed by blow molding said parison in said blow molding mold is taken out by said clamping device, and moved to said receiving position as kept in said opened mold state.

4. The apparatus for forming a hollow article according to claim 3, wherein said detaching position of each blow molding mold of said blow molding units is located on the outside of a support stage for supporting said extrusion device.

* * * * *